July 16, 1957 J. A. CARRIER 2,799,055
METHODS OF MAKING TAMPONS
Original Filed April 24, 1952 2 Sheets-Sheet 1
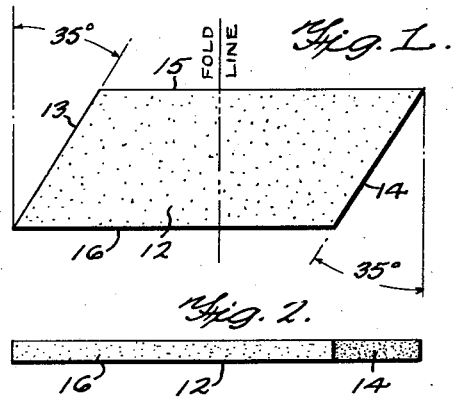
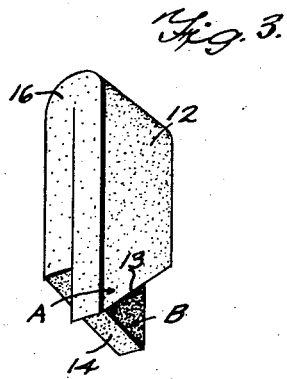
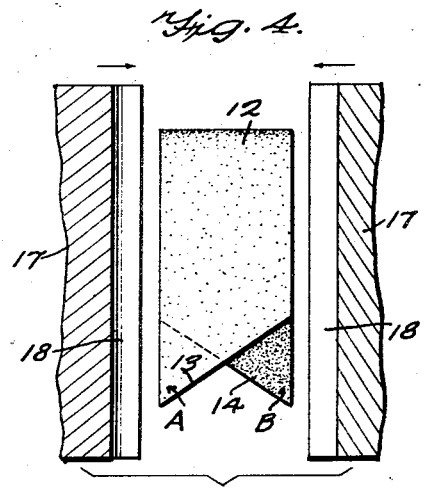
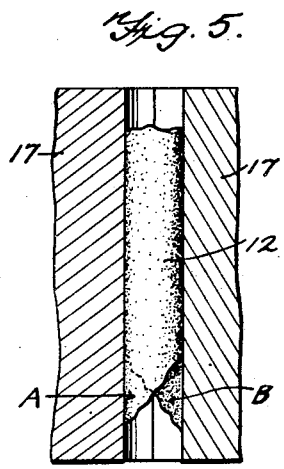
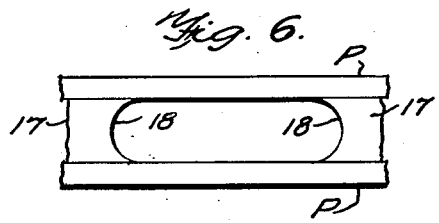
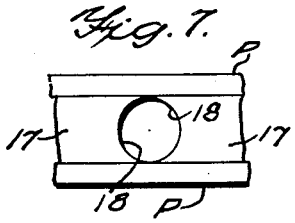
INVENTOR
JOHN A. CARRIER
BY
ATTORNEY July 16, 1957 J. A. CARRIER 2,799,055
METHODS OF MAKING TAMPONS
Original Filed April 24, 1952 2 Sheets-Sheet 2
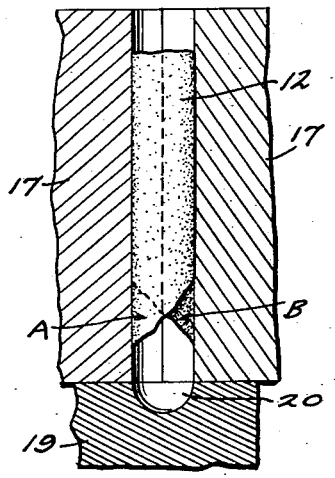
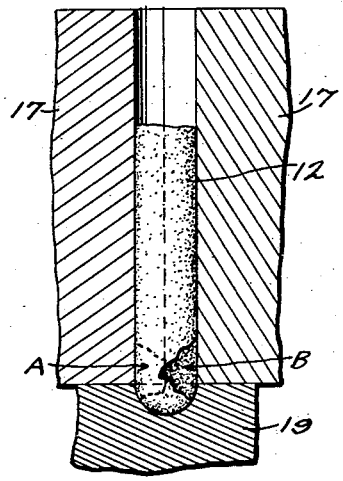
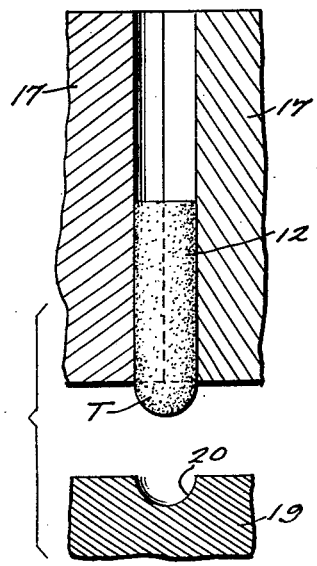
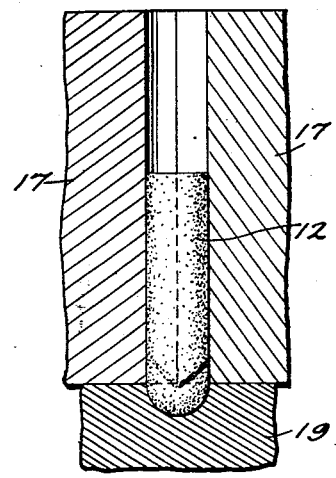
INVENTOR
JOHN A. CARRIER
BY
ATTORNEY United States Patent Office 2,799,055
Patented July 16, 1957

2,799,055

METHODS OF MAKING TAMPONS

John A. Carrier, Lexington, Mass., assignor to Sanitary Products Corporation, Chicago, Ill., a corporation of Illinois Original application April 24, 1952, Serial No. 284,171, now Patent No. 2,706,986, dated April 26, 1955. Divided and this application June 14, 1954, Serial No. 436,611

10 Claims. (Cl. 19—144.5)

The present invention relates to a method of making tampons, particularly to catamenial tampons.

Catamenial tampons have been in use for many years, increasing in popularity which the advent of refinements designed to increase their absorptive capacity and to facilitate their insertion. Prior art developments of this character evolved a tampon having a greater bulk of fibrous absorbent material compressed to a size convenient for insertion and covered, at least at the entrant end portion, with an envelope slippery when wet and of sufficient tensile strength while dry to retain the fibrous material in its compressed state and shape; the envelope being composed of material that dissolves quickly and disperses readily in body fluids, freeing the fibrous body of the tampon for expansion after insertion. Tampons of this special character are disclosed in U. S. Patents Nos. 2,340,311 and 2,440,141 to Arthur B. Donovan.

Due to the configuration of the vaginal cavity, the discharge of menstrual fluid from the uterus occurs adjacent the inserted entrant end or tip of a tampon. If maximum efficiency is to be achieved, the entrant end portion should be capable of absorbing the flow quickly to be efficient and prevent flow from leaking past the tampon at the time flow is heaviest. In prior art tampons, the compacting of the fibrous material resulting from compression militates against quick absorption, as does also the time interval required for dissolution of the lubricant tip in which the end portion is confined.

Some catamenial tampons have been manufactured with the entrant end rounded off or otherwise reduced in diameter to facilitate insertion. In prior art methods of manufacture such reduction results in a much greater compacting of the end than is necessary to achieve the slight stiffness requisite for easy insertion, and renders the tampons not particularly suitable for plastic film tipping in accordance with the method disclosed in the co-pending application Serial No. 284,136, filed April 24, 1952, wherein the lubricant tip is applied as a plastic film stretched over and upon the entrant end of the tampon to encase the same. The end shape and rigidity of the prior art tampons are such as to tear the film in blanks too small and irregular to serve as tips.

The present invention is designed to overcome the defects and disadvantages of the prior art in regard to end coating of tampons with plastic film and to end absorption.

An object of the invention is to provide a method for making a tampon wherein the entrant end portion is interally relieved to enable reduction in diameter without undesirable increase in density.

Another object is to provide a method for making a tampon having a rounded entrant end portion internally relieved in a manner to facilitate expansion following insertion and at the same time to promote and expedite the absorption of menstrual fluid.

A further object is to provide a method for making a tampon of novel construction having a well for the reception of menstrual fluid within the body thereof prior to absorption which provides a greater area of exposed fiber ends to the flow, which exposure represents an increased efficiency as an absorbing medium.

Still another object is to provide a method for making a tampon having an entrant end of novel construction specially adapted for the application thereto of a tip constituted from a strip of plastic film.

Other objects and advantages of the present invention will be apparent from the following description in conjunction with the accompanying drawings, in which:

Figure 1 is a plan view of a blank of absorbent material from which the tampon is formed;

Figure 2 is a side edge elevation thereof;

Figure 3 is a perspective view of the blank as folded for compression to cylindrical form;

Figure 4 is a view illustrating a preliminary step in the compression of the folded blank to cylindrical form;

Figure 5 is a view illustrating the final step of compression to cylindrical form;

Figure 6 is substantially an end elevation relative to Figure 4;

Figure 7 is substantially an end elevation relative to Figure 5;

Figure 8 is a view similar to Figure 5 illustrating the initial step of the end forming operation;

Figures 9 and 10 illustrate successive intermediate stages of the end forming operation; and Figure 11 illustrates the final stage of end forming.

In the practice of this invention a blank comprising a single strip 12 of fibrous absorbent material, preferably absorbent cotton, of about four inches in length and of suitable width, weight and thickness and total weight of material, is cut substantially in the form of a parallelogram with oblique angles to provide diagonal ends 13 and 14 inclined at an angle, preferably of from about thirty-five to about forty-five degrees, with respect to a plane perpendicular to the plane of the longitudinal median of the strip. It is, however, within the purview of this invention that the effective range of the angle of inclination is between zero and about fifty-five degrees; and that, if desired, the angle of inclination may be measured with reference to the sheet side edges 15 and 16. It is also within the purview of this invention that the blank may take the form of any quadrilateral figure having two side edges substantially parallel and at least one end edge partly or entirely inclined relative thereto.

The cut blank 12 is then doubled upon itself on a center line of fold perpendicular to the side edges 15 and 16, as in Fig. 3, to constitute a two-ply pad in which the inclined ends 13 and 14 overlap and intersect in the plane of the longitudinal median of the pad at the intended entrant end portion of the tampon. This arrangement results in a right triangle terminal portion on one ply and a similar terminal portion on the other, in which the ends 13 and 14 are their relatively reversed hypotenuses, and wherein their respective apex portions A and B are disposed at opposite side edges of the pad in spaced apart relation and in different planes.

As the next step, the cut and folded pad is placed between a pair of jaws 17 adapted for opposite reciprocation in a common plane into and from abutting engagement between a pair of spaced parallel side plates P. The distance between the plates is the diameter of the finished tampon. The opposed abutting faces of the jaws are each provided with a semicircular groove 18 over their full longitudinal extent to receive the doubled side edges of the pad when the jaws move together. Positioning of the pad and operation of the jaws is effected by any suitable means, not shown. The jaws are then closed against each other as in Fig. 5, whereupon the pad is radially compressed over its full length into a cylindrical body of the proper diameter as determined by the grooves 18 and plates P. During the course of this radial compression, which is applied uniformly over the full length of the pad, the respective apex portions A and B which project beyond the point of intersection of the oppositely inclined end edges 13 and 14 are pressed into and fill the spaces resulting from the inclination of the ends inwardly of their point of intersection, and are therefore compressed to a lesser degree than the remainder of the pad, with a resultant lesser compacting of their fibers.

At the end of the radial compression operation the overlapped apex portions A and B of the pad are end-compressed longitudinally of the pad and simultaneously rounded off to constitute the entrant end portion of the tampon, as shown in Figs. 8–11. It is an important aspect of this invention that this compression is imparted mainly to the entrant end portion of the tampon, so that the fibers of the tampon body are not compressed longitudinally thereof substantially inwardly beyond that plane normal to the axis of the tampon which defines the bases of the right triangle apex portions A and B.

In carrying out the end shaping operation, an end former 19 having a substantially semi-spherical socket 20 on the diameter of the tampon is applied and held flatly against the closed jaws 17, as in Fig. 8, with the socket registered axially with the cylindrical bore formed by the opposed grooves 18 in which the radially compressed pad is held, and in a position to receive the apex portions A and B of the pad. Pressure is then applied to the other end of the pad by any suitable means, not shown, preferably a plunger, and it is forced axially into the socket. As the portions A and B enter the socket they follow its contour and are further overlapped with a simultaneous axial and radial pressure that progressively increases with advance of the pad, as indicated in Figs. 9 and 10. When the desired degree of end compression is reached further axial movement of the pad is stopped, the end former 19 is withdrawn as in Fig. 11, and the completely shaped pad is removed from the jaws. In the end shaping operation the pad portions A and B are merged together as a rounded tip T of smooth surface which conforms approximately to the shape of the former socket 20.

By operations not a part of the present invention, the tip is encased in a plastic film of suitable composition which is stretched over the tip and which is slippery when wet and sufficiently strong while dry to retain the fibrous material of the tip and adjacent end portion in its compressed state and shape, and which dissolves quickly or disperses readily in body fluids; and a pull string is attached to the other end.

When the tampon is applied in service, its tip casing dissolves rapidly and releases the portions A and B which thereupon expand and separate to assume substantially their original shape prior to compression. At the same time the adjacent end portion of the tampon expands longitudinally, so that the tapered ends of the portions A and B are projected into the vaginal cavity into the region of heaviest menstrual fluid discharge. The inclined edges 13 and 14 meet at the apex of a V-shaped well that is open to its greatest degree at the extreme tip of the tampon and exposes a greater area of fiber ends to the fluid to be absorbed. This well allows menstrual fluid to flow into and through the center of the tampon from its open entrant end and permits absorption to a much greater extent than would be possible if the terminal portions A and B were square cut. The area of the well and the extent of fluid absorption increase with increase in the angle of inclination at which the ends 13 and 14 are cut, so that the greater the angle the more effective this factor becomes up to the point at which the portions A and B are so sharply pointed that the fibrous material at the points pulls away and separates from the body of the tampon and is not removed when the tampon is withdrawn. It has been found that this undesirable separation is most likely to occur whenever the angle of inclination is increased beyond fifty-five degrees.

From the foregoing detailed description, it is apparent that the invention in its broader aspects contemplates a substantially cylindrical tampon with a rounded entrant end portion constituted of juxtaposed sections pressed closely together both radially and longitudinally in proper shape to provide a core over and upon which a prefabricated plastic film can be stretched without rupturing, to form a tip of desired composition which encases the end and holds the fibrous material thereof in compressed state and shape until dissolved. The sections have side edges that converge to a point in the end of the tampon, and are so arranged that an edge of one section crosses an edge of the other diagonally at the axis of the tampon while the other edges of the sections meet in abutting relation longitudinally of the tampon in its peripheral zone. Due to this arrangement, the sections separate radially upon expansion incident to fluid absorption, with a resultant opening of their crossed edges to provide a longitudinal well along the axis of the tampon for the reception and quicker absorption of fluid internally of the tampon. Also by this arrangement, the diagonal crossing of the section edges provides space to receive the material at the apices of the sections when they are pressed together in the formation of the tampon, so that the density of the material is not unduly increased upon compression and the desired shape is more easily obtained.

It is to be understood that the present disclosure is illustrative and not restrictive, and that the invention may be practiced in any manner and by any embodiment consistent with its scope as claimed. The invention includes any means or method whereby the mass of absorbent material at the end of the tampon be made less than it is throughout the rest of the body. The essential factor is that some material at the end be relieved. This relief may be accomplished, for example, by pulling away some of the material or cutting some of it away by notches, or by other means than the straight angle cut herein specifically shown and described.

The present application is a divisional application of my co-pending case, Serial No. 284,171 filed April 24, 1952, now Pat. No. 2,706,986.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. Method of forming a tampon, which comprises, doubling upon itself an oblique angled parallelogram of fibrous absorbent material to constitute a pad with overlapped ends, compressing the pad into substantially cylindrical form and forcibly interengaging said ends, and compressing the interengaged ends longitudinally of the pad to provide a stiffened entrant end thereon.

2. Method of forming a tampon, which comprises, doubling upon itself an oblique angled parallelogram of fibrous absorbent material to constitute a pad with overlapped ends, compressing the pad into substantially cylindrical shape and simultaneously forcing a portion of each end laterally into engagement with the other, and compressing the ends longitudinally of the pad to provide a stiffened entrant end thereon.

3. Method of forming a tampon, which comprises, doubling upon itself an oblique angled parallelogram of fibrous absorbent material to constitute a pad with overlapped ends having pointed portions spaced part transversely thereof, compressing the pad into substantially cylindrical shape and at the same time pressing the pointed portions together radially, and moving the pad bodily against a substantially semi-spherical shaping means engaging said pointed portions axially to compress them into a rounded tip.

4. Method of forming a tampon, which comprises, doubling upon itself an oblique angled parallelogram of fibrous absorbent material to constitute a pad with pointed overlapped ends, compressing the pad into substantially cylindrical form and by the same operation forcing portions of the ends radially in opposite directions into interengagement, and increasing the density of the interengaged ends by pressing the same longitudinally against rigid end forming means.

5. Method of forming a tampon, which comprises, doubling upon itself an oblique angled parallelogram of fibrous absorbent material to constitute a pad with overlapped ends, compressing the pad into substantially cylindrical shape and pressing a portion of each end radially into abutting engagement with the other, compressing the ends longitudinally of the pad to provide a stiffened entrant end thereon, and shaping said end as a rounded tip.

6. Method of forming a tampon, which comprises, doubling upon itself an oblique angled parallelogram of fibrous absorbent material to constitute a pad with overlapped ends, compressing the pad into substantially cylindrical shape and pressing the ends radially into engagement with each other, increasing the density of said ends by longitudinal compression, and simultaneously shaping the engaged ends into a rounded tip.

7. Method of forming a tampon, which comprises, cutting a strip of fibrous absorbent material as a parallelogram with oblique angles to form a pad, folding the pad upon itself on a line of fold perpendicular to the plane of its longitudinal axis to overlap its ends, compressing the folded pad into substantially cylindrical form, and, while the pad is so compressed, compressing its overlapped ends upon each other into the form of a rounded tip.

8. Method of forming a tampon, which comprises, cutting a strip of fibrous absorbent material as a parallelogram with oblique angles to form a pad, folding the pad upon itself to overlap its ends, compressing the folded pad into substantially cylindrical form, and pressing the overlapped ends together in the form of a rounded tip.

9. Method of forming a tampon, which comprises, shaping a strip of fibrous absorbent material as a parallelogram with inclined ends, doubling the strip upon itself to overlap its ends, shaping the doubled strip into substantially cylindrical form, and pressing the overlapped ends together in the form of a substantially semi-spherical tip.

10. Method of forming a tampon, which comprises, shaping a strip of fibrous absorbent material as a parallelogram with inclined end edges, doubling the strip upon itself on a line of fold extending transversely between its side edges to dispose its ends in substantially parallel planes, compressing the doubled strip into substantially cylindrical form and forcing a portion of each end laterally into full face engagement with the inclined edge of the other end, and applying pressure to said ends longitudinally of the pad to increase the density of the absorbent material comprising the entrant end portion of the tampon.

References Cited in the file of this patent

UNITED STATES PATENTS

| | | |
|---|---|---|
| 2,286,817 | Knight | June 16, 1942 |
| 2,440,141 | Donovan | Apr. 20, 1948 |
| 2,499,414 | Rabell | Mar. 7, 1950 |
| 2,529,183 | Parish | Nov. 7, 1950 |